US009131008B2

(12) United States Patent
Brown et al.

(10) Patent No.: US 9,131,008 B2
(45) Date of Patent: Sep. 8, 2015

(54) DISCOVERY PROFILE BASED UNIFIED CREDENTIAL PROCESSING FOR DISPARATE SECURITY DOMAINS

(75) Inventors: Eric W. Brown, Cary, NC (US); Ramamohan Chennamsetty, Highland, NY (US); Abraham L. Woldemichael, Laurel, MD (US)

(73) Assignee: LENOVO ENTERPRISE SOLUTIONS (SINGAPORE) PTE. LTD., New Tech Park (SG)

( * ) Notice: Subject to any disclaimer, the term of this patent is extended or adjusted under 35 U.S.C. 154(b) by 867 days.

(21) Appl. No.: 12/242,216

(22) Filed: Sep. 30, 2008

(65) Prior Publication Data

US 2010/0083355 A1 Apr. 1, 2010

(51) Int. Cl.

*H04L 9/32* (2006.01)
*H04L 29/08* (2006.01)
*H04L 29/06* (2006.01)

(52) U.S. Cl.

CPC .......... *H04L 67/306* (2013.01); *H04L 63/0815* (2013.01)

(58) Field of Classification Search

None

See application file for complete search history.

(56) References Cited

U.S. PATENT DOCUMENTS 5,586,260 A * 12/1996 Hu .................................. 726/12
5,774,551 A * 6/1998 Wu et al. ....................... 713/155
6,067,623 A 5/2000 Blakley, III et al.
6,219,790 B1 * 4/2001 Lloyd et al. ..................... 726/14
7,039,714 B1 * 5/2006 Blakley, III et al. .......... 709/229
7,370,351 B1 * 5/2008 Ramachandran et al. ........ 726/8
2003/0046391 A1 * 3/2003 Moreh et al. .................. 709/225
2005/0114701 A1 * 5/2005 Atkins et al. .................. 713/201
2005/0149496 A1 * 7/2005 Mukherjee et al. ............... 707/3
2005/0223412 A1 * 10/2005 Nadalin et al. .................... 726/3
2005/0223413 A1 * 10/2005 Duggan et al. .................... 726/3
2006/0021010 A1 1/2006 Atkins et al.
2007/0005801 A1 * 1/2007 Kumar et al. ................. 709/238
2008/0104244 A1 * 5/2008 Chen et al. .................... 709/226
2009/0319663 A1 * 12/2009 Giles et al. .................... 709/226

* cited by examiner

*Primary Examiner* — Michael R Vaughan

(74) *Attorney, Agent, or Firm* — Steven M. Greenberg, Esq.; CRGO Law

(57) ABSTRACT

A method for discovery profile based unified credential processing for disparate security domains can include loading a discovery profile specifying types of manageable resources to be discovered during discovery of manageable resources and authentication protocols for use in accessing each type of the resources. The method also can include discovering the resources across disparate security domains and selecting a discovered one of the resources in a particular one of the security domains for a systems management task. The method further can include transforming an authentication credential not specific to the particular one of the security domains to a mapped authentication credential specific to the particular one of the security domains and authenticating into the particular one of the security domains with the mapped authentication credential utilizing an authentication protocol specified by the profile in order to perform the systems management task on the selected discovered one of the resources.

17 Claims, 2 Drawing Sheets

DISCOVERY PROFILE BASED UNIFIED CREDENTIAL PROCESSING FOR DISPARATE SECURITY DOMAINS

BACKGROUND OF THE INVENTION

1. Field of the Invention

The present invention relates to the field of access control in a security domain and more particularly to credential authentication for different target resources across disparate security domains.

2. Description of the Related Art

Authentication and access control provide a secure mode of access to resources in a computing environment. In its most basic form, authentication and access control provide for credential protected access to a resource such as an application, a server, or a device. The resulting protected environment can be viewed as a security domain. A security domain can be described as a domain which uses a single user registry and associated authentication mechanisms for credential authentication.

For modest computing environments of a single security domain, authentication and access control can be managed simplistically by prompting an end user for an authentication credential—typically a user identification/password combination. More sophisticated implementations can provide for single sign-on convenience in which the end user need provide a user identification/password combination only once when prompted and the resulting credential authentication can be provided automatically to other applications requiring authentication without repeatedly prompting the end user for user credentials.

Authentication and access control can be complicated when interacting with resources in different security domains. In this regard, resources in different security domains can require different authentication credentials from the same end user. Accordingly, resources within different security domains cannot accommodate single sign-on for access control. Rather, an end user must offer authentication credentials when prompted for each resource in a different security domain.

One of the important goals of resource virtualization is being able to access variety of resources using set of standard interfaces, irrespective of different security domains to which the resources belong. In the resource management scenario, it will be apparent that various resources belong to multiple security domains. A discovery process used to discover manageable resources need not be limited to a single security domain and, oftentimes, it is necessary to authenticate into and access different resources across disparate security domains. Each different discoverable manageable resource can require not only different authentication credentials, but also can require or at least prefer a different authentication and security protocol through which the resource is to be accessed. Consequently, federating the multiple security domains during the discovery process using credential transformation services for achieving end to end security is desirable.

Recently developed systems management data processing systems provide on demand resource management solution incorporating security services aimed at providing secure end to end interactions between resource management services of the systems management data processing system and other services deployed within the environment. Resource discovery remains part and parcel of the on demand resource management solution. In any case, the security capabilities are intended to enable the secure interaction between the services of the systems management data processing system and manageable resources.

Within a systems management data processing system, mapping between authentication credentials and endpoints has not been well defined to solve the complex issues that arise with systems management. The complexity arises generally due to the necessity of managing different endpoints, on different platforms, each of a different type. However, each of the different endpoints supports different protocols and each protocol support different credential types for authentication.

BRIEF SUMMARY OF THE INVENTION

Embodiments of the present invention address deficiencies of the art in respect to credential mapping for multiple, disparate security domains and provide a novel and non-obvious method, system and computer program product for unified credential processing for disparate security domains. In an embodiment of the invention, a method for unified credential processing for disparate security domains can include loading a discovery profile specifying types of manageable resources to be discovered during discovery of manageable resources and authentication protocols for use in accessing each type of the manageable resources. The method also can include discovering manageable resources across disparate security domains in a computer communications network and selecting a discovered one of the manageable resources in a particular one of the disparate security domains for a systems management task.

Yet further, the method can include transforming an authentication credential not specific to the particular one of the disparate security domains to a mapped authentication credential specific to the particular one of the disparate security domains. Finally, the method can include authenticating into the particular one of the disparate security domains with the mapped authentication credential utilizing an authentication protocol specified by the discovery profile in order to perform the systems management task on the selected discovered one of the manageable resources.

In one aspect of the embodiment, transforming an authentication credential not specific to the particular one of the disparate security domains to a mapped authentication credential specific to the particular one of the disparate security domains can include determining a user identity associated with the systems management task and not specific to the particular one of the disparate security domains, and mapping the user identity with an authentication credential specific to a user identity for the particular one of the disparate security domains. In another aspect of the embodiment, transforming an authentication credential not specific to the particular one of the disparate security domains to a mapped authentication credential specific to the particular one of the disparate security domains can include determining a user identity associated with the systems management task and not specific to the particular one of the disparate security domains, and mapping the user identity with an authentication credential specific to a user identity for the particular one of the disparate security domains but not specific to a user identity associated with the systems management task.

In yet a further aspect of the embodiment, transforming an authentication credential not specific to the particular one of the disparate security domains to a mapped authentication credential specific to the particular one of the disparate security domains can include determining a source service associated with the systems management task and mapping the source service with an authentication credential specific to a user identity for the particular one of the disparate security domains. In even yet a further aspect of the embodiment, transforming an authentication credential not specific to the particular one of the disparate security domains to a mapped authentication credential specific to the particular one of the disparate security domains can include determining a target service for the manageable resource associated with the systems management task and mapping the target service with an authentication credential specific to a user identity for the particular one of the disparate security domains.

In another embodiment of the invention, a systems management data processing system can be provided. The system can include a host systems management computing platform configured for systems management of physical and virtual resources in disparate security domains. The system further can include a discovery profile specifying types of manageable resources to be discovered and corresponding authentication protocols for use in accessing the types of the manageable resource. The system yet further can include a credential map of authentication credentials not specific to the particular one of the disparate security domains to authentication credentials specific to particular ones of the disparate security domains. Finally, the system can include a a credential transformation service (CTS) executing in the host systems management computing platform.

The CTS can include program code enabled to access the credential map to transform an authentication credential not specific to a particular one of the disparate security domains to a mapped authentication credential specific to a particular one of the disparate security domains and to authenticate according to an authentication protocol specified by the discovery profile into the particular one of the disparate security domains with the mapped authentication credential in order to perform a systems management task on a selected one of the resources.

In one aspect of the embodiment, the system can also include a resource discovery and management module coupled to the CTS and configured to identify and discover manageable ones of the resources across the disparate security domains. Further, the resource discovery and management module can be configured to perform systems management tasks upon discovered ones of the resources subject to credential authentication in a corresponding one of the disparate security domains. Yet further, a persistence service can implement an adapter design pattern and can be disposed between the credential map and the CTS. In particular, the persistence service can provide an interface to the credential map for the CTS.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for discovery profile based unified credential processing for disparate security domains. In accordance with an embodiment of the present invention, a CTS can be provided to securely federate authentication credentials across disparate security domains. Specifically, the CTS can provide identity mapping for the authentication credentials of users across various security domains or realms hosting different discoverable manageable resources. Further, a discovery profile can specify types of manageable resources to be discovered and corresponding authentication protocols for use in accessing the types of the manageable resource.

End users can interact with an interface to the CTS to map respective authentication credentials for a security domain to authentication credentials for a different security domain in which one or more manageable resources are to be discovered and accessed. Consequently, the discovery profile allows the manageable resources to securely discovered without requiring user intervention. Further, the credential mapping allows a user requesting access to a system or application in to be authenticated with each different security domain with appropriate authentication credentials for that system or application according to an authentication protocol specified by the discovery profile without requiring the user to provide the requisite authentication credentials for the different security domain.

Figure 1:
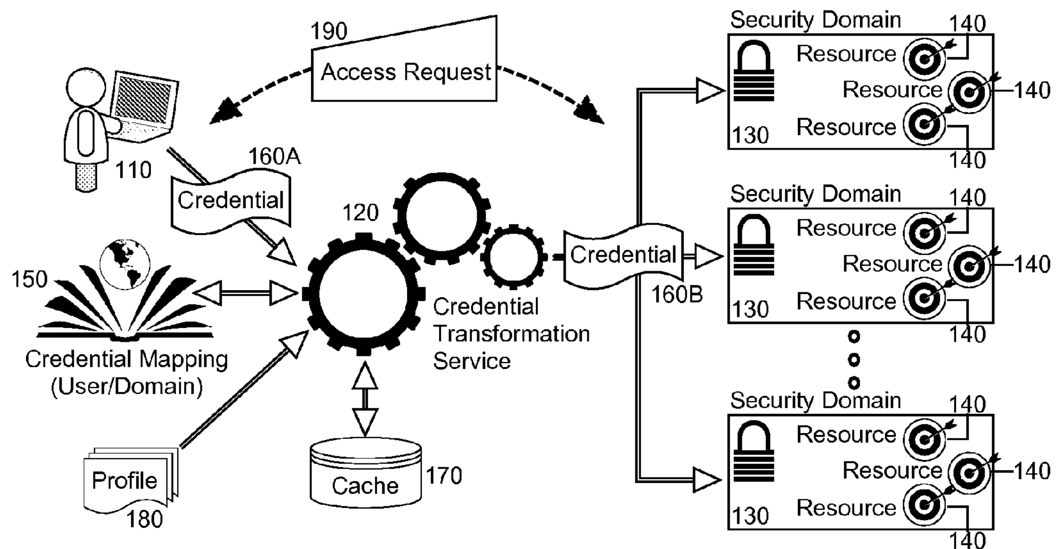
FIG. 1 is a pictorial illustration of a process for discovery profile based unified credential processing for disparate security domains.

In further illustration, FIG. 1 pictorially depicts a process for discovery profile based unified credential processing for disparate security domains. As shown in FIG. 1, an end user 110 can submit an authentication credential 160A to a CTS 120 in connection with an access request to a target resource 140 within a particular security domain 130. The CTS 120 can map the authentication credential 160A in credential mapping 150 to an authentication credential 160B specific to the particular security domain 130. The mapping of the authentication credential 160A to authentication 160B can be stored in cache 170 for subsequent retrieval by CTS 120 in connection with subsequent access requests to the target resource 140 in the particular security domain 130. Further, different profiles 180 can be accessed by the CTS 120 to determine an authentication protocol requisite to the discovery and access of the target resources 140 in corresponding security domains 130.

Figure 2:
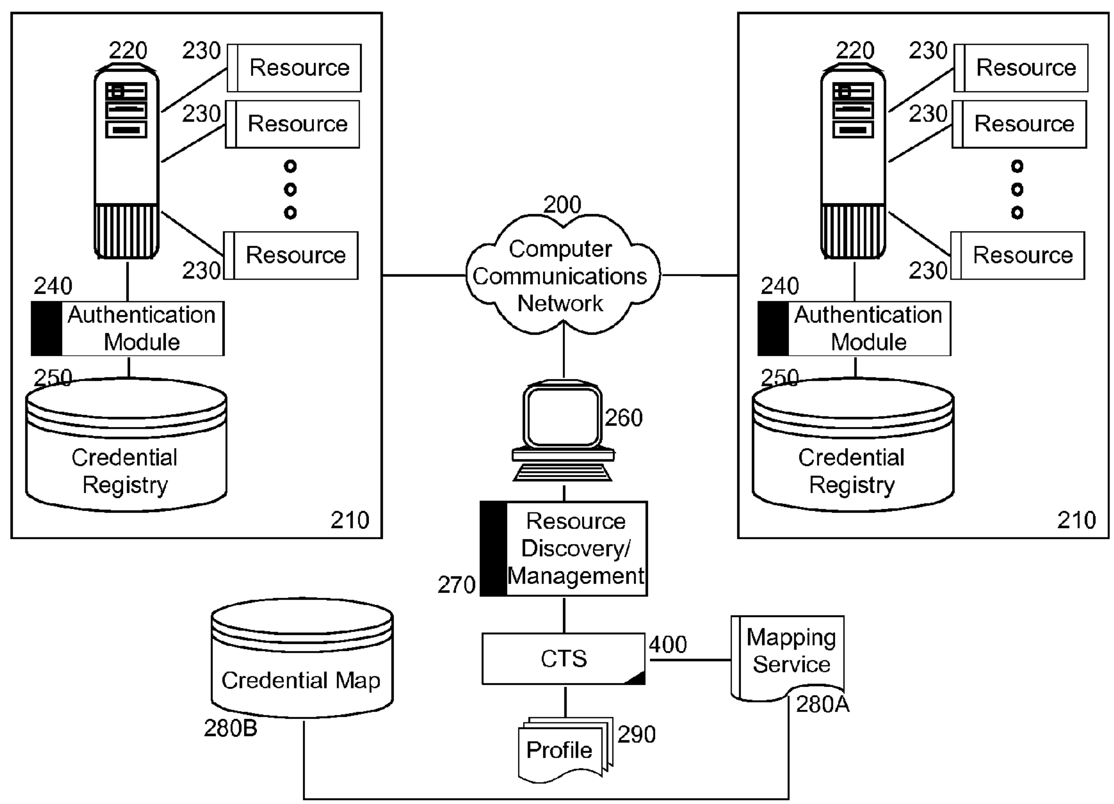
FIG. 2 is a schematic illustration of a systems management data processing system configured for discovery profile based unified credential processing for disparate security domains.

In particular, a systems management interface (not shown) can access the CTS 120 in order to retrieve the profiles 180 specifying respective authentication protocols necessary to discover individual ones of the target resources 140. Thereafter, the systems management interface can discover the different target resources 140 with the requisite authentication protocol and can access the target resources 140 in the different security domains 130 once discovered by the systems management interface. In this way, the end user 110 need not manually submit different authentication credentials 160B for each of the disparate security domains 130 when directing systems management tasks in respect to the target resources 140 in the disparate security domains 130. In more particular illustration, FIG. 2 is a schematic illustration of a systems management data processing system configured for discovery profile based unified credential processing for disparate security domains.

The system can include a host systems management computing platform 260 configured for systems management of physical and virtual resources in a distributed computing environment. The host systems management computing platform 260 can be coupled to multiple different security domains 210 over computer communications network 200, each security domain 210 including one or more physical or virtual resources 230 hosted by one or more respective host servers 220. Further, each security domain 210 can include an authentication module 240 communicatively linked to a credential registry 250 of authentication credentials specifying permissible access to the resources 230 in the security domain 210 by user and password, by way of example.

A resource discovery and management module 270 can be included with the host systems management computing platform 260. The resource discovery and management module 270 can be configured to access a set of discovery profiles 290. Each of the profiles 290 can specify a scope of discovery of target resources 230, different types of target resources 230 to be discovered and an authentication protocol necessary to securely discover and access each of the target resources. As such, the resource discovery and management module 270 can be configured to identify and locate manageable ones of the resources 230 across the different security domains 210 using the requisite authentication protocol according to a selected one of the discovery profiles 290. The resource discovery and management module 270 further can be configured to perform management tasks upon discovered ones of the resources 230 subject to credential authentication in a corresponding authentication module 240.

Of note, a CTS 400 can be coupled to the resource discovery and management module 270. The CTS 400 further can be coupled to a mapping service 280A accessing a credential map 280B. The credential map 280B can include a mapping of authentication credentials to authentication credentials specific to a particular one of the security domains 210. In this regard, the credential map 280B can include a user-to-user mapping of authentication credentials, a multiple user to single user mapping of authentication credentials, a source service to user mapping of authentication credentials, or a user to target service mapping of authentication credentials, to name a few variations of mappings.

The mapping service 280A can be arranged to receive requests for credential mapping based upon a user identity, corresponding credentials and a target resource. The mapping service 280A further can be arranged in response to a request for credential mapping to look up a mapped credential for the target resource and user identity in the credential map 280B and to return the same to the CTS 400. By comparison, the CTS 400 can include program code to issue credential mapping requests to the mapping service 280A for target ones of the resources 230 as required by systems management tasks directed by the resource discovery and management module 270. Accordingly, as the resource discovery and management module 270 discovers manageable ones of the resources 140 in different security domains 210, systems management tasks can be directed by an end user upon the management resources 140 subsequent to credential authentication without burdening the end user to authenticate into each of the different security domains 210.

Figure 3:
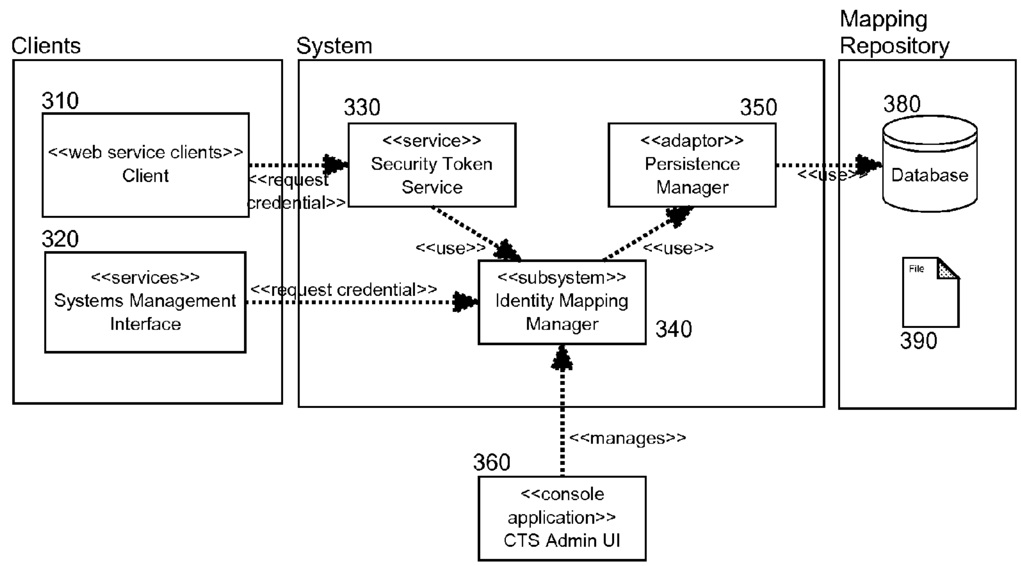
FIG. 3 is an object diagram of a CTS configured for discovery profile based unified credential processing for disparate security domains; and, FIG. 4 is a flow chart illustrating a process for discovery profile based unified credential processing for disparate security domains.

In yet further illustration of structure of the CTS 400 relative to the host systems management computing platform 260 and the credential map 290, FIG. 3 is an object diagram of a CTS configured for discovery profile based unified credential processing for disparate security domains. As shown in FIG. 3, a systems management client can include a systems management interface 320 and a Web services client 310, both incorporating one or more methods defined to request authentication credentials from the CTS. The CTS can include each of a security token service 330, an identity mapping manager 340 and a persistence manager 350 implementing an adaptor interface.

The persistence manager 350 can include one or more methods defined to access a database 380 in a mapping repository storing credential mappings of base credentials to credentials specific to a particular security domain. As such, the mapping repository can vary in implementation without affecting the interface to the database 380. The security token service 330 can provide an interface to the Web services client 330 to request credentials for a target resource in a particular security domain. The identity mapping manager 340 in turn can provide an interface both to the security token service 330 and to the systems management interface 320 to request credential mappings from the database 380 and to permit the addition, modification and removal of credential mappings within the database 380 through an external console user interface 360.

Figure 4:
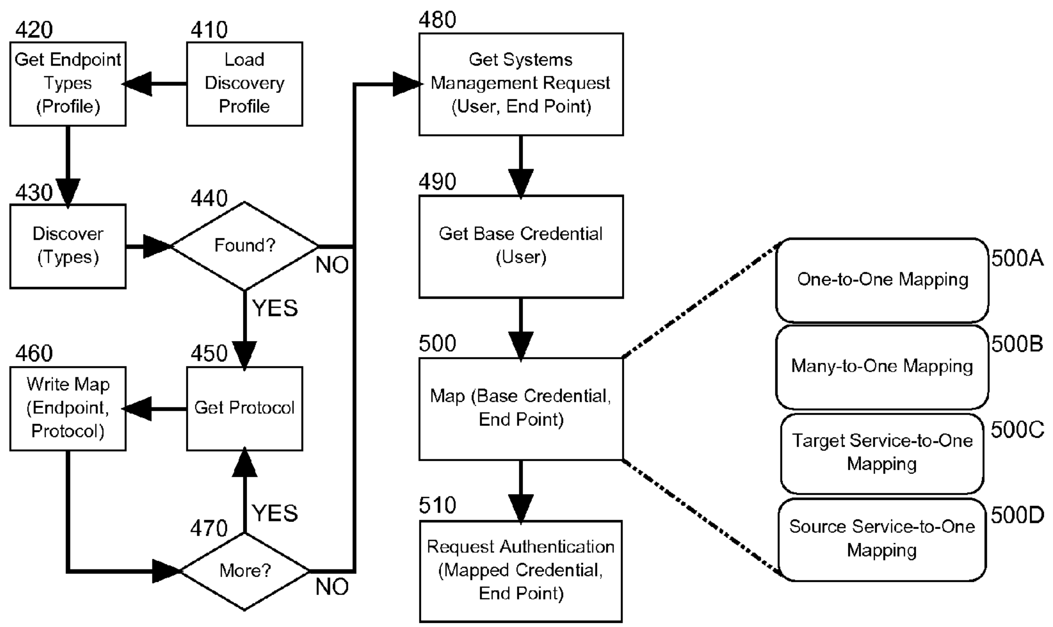

In even yet further illustration of the operation of the CTS 400 of FIG. 2, FIG. 4 is a flow chart illustrating a process for discovery profile based unified credential processing for disparate security domains. Beginning in block 410, a discovery profile can be loaded and in block 420, different target manageable resource types can be identified in the discovery profile. In block 430, manageable resources can be discovered according to the identified types and, in decision block 440, if a manageable resource is discovered, in block 450 a requisite authentication protocol for the discovered manageable resource can be retrieved from the discovery profile. In block 460, a mapping can be established for the discovered manageable resource to include the requisite authentication protocol. Finally, in decision block 470 if additional manageable resources are discovered the process can repeat through block 450. Otherwise, the process can proceed to block 480.

In block 480, a systems management request can be received for a target resource in a particular security domain for a particular user. In block 490, a base credential can be retrieved for the particular user and in block 500, the base credential can be mapped to a requisite authentication credential for the target resource and authentication into the particular security domain can be requested with the mapped credential in block 510. In this regard, flexibly, different mappings can be provided.

The mappings can include a one-to-one mapping 500A of a specific credential to a provided credential such that the specific credential is dependent upon the identity of the user associated with the provided credential. The mappings further can include a many-to-one mapping 500B of a specific credential irrespective of an identity of a user associated with the provided credential. The mappings yet further can include a target service-to-one mapping 500C of a specific credential dependent upon an identity of a service targeted by the systems management request. Finally, the mappings can include a source service-to-one mapping 500D of a specific credential dependent upon a source service of the systems management request.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for discovery profile based unified credential processing for disparate security domains comprising:

loading into memory of a computer a discovery profile specifying types of manageable resources to be discovered during discovery of manageable resources and authentication protocols for use in accessing each type of the manageable resources;

discovering by a processor of the computer manageable resources according to the discovery profile across disparate security domains in a computer communications network;

selecting by the processor a discovered one of the manageable resources in a particular one of the disparate security domains for a systems management task;

transforming by the processor an authentication credential not specific to the particular one of the disparate security domains to a mapped authentication credential specific to the particular one of the disparate security domains; and, authenticating by the processor into the particular one of the disparate security domains with the mapped authentication credential utilizing an authentication protocol specified by the discovery profile in order to perform the systems management task on the selected discovered one of the manageable resources.

2. The method of claim 1, wherein transforming an authentication credential not specific to the particular one of the disparate security domains to a mapped authentication credential specific to the particular one of the disparate security domains, comprises:

determining a user identity associated with the systems management task and not specific to the particular one of the disparate security domains; and, mapping the user identity with an authentication credential specific to a user identity for the particular one of the disparate security domains.

3. The method of claim 1, wherein transforming an authentication credential not specific to the particular one of the disparate security domains to a mapped authentication credential specific to the particular one of the disparate security domains, comprises:

determining a user identity associated with the systems management task and not specific to the particular one of the disparate security domains; and, mapping the user identity with an authentication credential specific to a user identity for the particular one of the disparate security domains but not specific to a user identity associated with the systems management task.

4. The method of claim 1, wherein transforming an authentication credential not specific to the particular one of the disparate security domains to a mapped authentication credential specific to the particular one of the disparate security domains, comprises:

determining a source service associated with the systems management task; and, mapping the source service with an authentication credential specific to a user identity for the particular one of the disparate security domains.

5. The method of claim 1, wherein transforming an authentication credential not specific to the particular one of the disparate security domains to a mapped authentication credential specific to the particular one of the disparate security domains, comprises:

determining a target service for the manageable resource associated with the systems management task; and, mapping the target service with an authentication credential specific to a user identity for the particular one of the disparate security domains.

6. A systems management data processing system comprising:

a host systems management computing platform comprising a computer with memory and at least one processor and configured for systems management of physical and virtual resources in disparate security domains;

a discovery profile specifying types of manageable resources to be discovered and corresponding authentication protocols for use in accessing the types of the manageable resource;

a credential map of authentication credentials not specific to the particular one of the disparate security domains to authentication credentials specific to particular ones of the disparate security domains; and, a credential transformation service (CTS) executing in the host systems management computing platform, the CTS comprising program code enabled to access the credential map to transform an authentication credential not specific to a particular one of the disparate security domains to a mapped authentication credential specific to a particular one of the disparate security domains and to authenticate according to an authentication protocol specified by the discovery profile into the particular one of the disparate security domains with the mapped authentication credential in order to perform a systems management task on a selected one of the resources.

7. The system of claim 6, further comprising a resource discovery and management module coupled to the CTS and configured to identify and discover manageable ones of the resources across the disparate security domains, the resource discovery and management module being further configured to perform systems management tasks upon discovered ones of the resources subject to credential authentication in a corresponding one of the disparate security domains.

8. The system of claim 6, further comprising a persistence service implementing an adapter design pattern and disposed between the credential map and the CTS, the persistence service providing an interface to the credential map for the CTS.

9. The system of claim 6, wherein the credential map comprises a credential map of authentication credentials for a user identity associated with the systems management task and not specific to the particular one of the disparate security domains to authentication credentials specific to a user identity for the particular ones of the disparate security domains.

10. The system of claim 6, wherein the credential map comprises a credential map of authentication credentials for a user identity associated with the systems management task and not specific to the particular one of the disparate security domains to authentication credentials specific to a user identity for the particular ones of the disparate security domains but not specific to a user identity associated with the systems management task.

11. The system of claim 6, wherein the credential map comprises a credential map of authentication credentials for a source service associated with the systems management task and not specific to the particular one of the disparate security domains to authentication credentials specific to a user identity for the particular ones of the disparate security domains.

12. The system of claim 6, wherein the credential map comprises a credential map of authentication credentials for a target service associated with the systems management task and not specific to the particular one of the disparate security domains to authentication credentials specific to a user identity for the particular ones of the disparate security domains.

13. A computer program product comprising a non-transitory computer usable storage medium storing computer usable program code for discovery profile based unified credential processing for disparate security domains, the computer program product comprising:

computer usable program code for discovering manageable resources across disparate security domains in a computer communications network;

computer usable program code for selecting a discovered one of the manageable resources in a particular one of the disparate security domains for a systems management task;

computer usable program code for transforming an authentication credential not specific to the particular one of the disparate security domains to a mapped authentication credential specific to the particular one of the disparate security domains; and, computer usable program code for authenticating into the particular one of the disparate security domains with the mapped authentication credential in order to perform the systems management task on the selected discovered one of the manageable resources.

14. The computer program product of claim 13, wherein the computer usable program code for transforming an authentication credential not specific to the particular one of the disparate security domains to a mapped authentication credential specific to the particular one of the disparate security domains, comprises:

computer usable program code for determining a user identity associated with the systems management task and not specific to the particular one of the disparate security domains; and, computer usable program code for mapping the user identity with an authentication credential specific to a user identity for the particular one of the disparate security domains.

15. The computer program product of claim 13, wherein the computer usable program code for transforming an authentication credential not specific to the particular one of the disparate security domains to a mapped authentication credential specific to the particular one of the disparate security domains, comprises:

computer usable program code for determining a user identity associated with the systems management task and not specific to the particular one of the disparate security domains; and, computer usable program code for mapping the user identity with an authentication credential specific to a user identity for the particular one of the disparate security domains but not specific to a user identity associated with the systems management task.

16. The computer program product of claim 13, wherein the computer usable program code for transforming an authentication credential not specific to the particular one of the disparate security domains to a mapped authentication credential specific to the particular one of the disparate security domains, comprises:

computer usable program code for determining a source service associated with the systems management task; and, computer usable program code for mapping the source service with an authentication credential specific to a user identity for the particular one of the disparate security domains.

17. The computer program product of claim 13, wherein the computer usable program code for transforming an authentication credential not specific to the particular one of the disparate security domains to a mapped authentication credential specific to the particular one of the disparate security domains, comprises:

computer usable program code for determining a target service for the manageable resource associated with the systems management task; and, computer usable program code for mapping the target service with an authentication credential specific to a user identity for the particular one of the disparate security domains.

* * * * *